United States Patent [19]
Aldinger et al.

[11] 4,303,635
[45] Dec. 1, 1981

[54] ZINC SULFIDE BODY FOR OPTICAL PURPOSES

[75] Inventors: Fritz Aldinger, Rodenbach; Waltraud Werdecker, Hanau, both of Fed. Rep. of Germany

[73] Assignee: W. C. Heraeus GmbH, Postfach, Fed. Rep. of Germany

[21] Appl. No.: 150,378

[22] Filed: May 15, 1980

[30] Foreign Application Priority Data

Dec. 8, 1979 [DE]  Fed. Rep. of Germany ....... 2949512

[51] Int. Cl.$^3$ .................. C01G 9/08; B29D 11/00; G02B 5/22
[52] U.S. Cl. ........................ 423/561 B; 264/1; 350/1.1
[58] Field of Search ................ 423/561 B; 264/1; 350/1.1

[56] References Cited

U.S. PATENT DOCUMENTS

| | | | |
|---|---|---|---|
| 3,131,025 | 4/1964 | Carnall, Jr. et al. | 423/561 B |
| 3,131,238 | 4/1964 | Carnall, Jr. et al. | 423/561 B |
| 3,178,307 | 4/1965 | Carnall, Jr. et al. | 264/1 |
| 3,311,522 | 3/1967 | Ladd et al. | 264/1 |
| 3,362,795 | 1/1968 | Weisbeck | 423/561 B |
| 3,454,685 | 7/1969 | Roy et al. | 264/1 |
| 3,475,116 | 10/1969 | Carnall, Jr. et al. | 264/1 |
| 3,502,386 | 3/1970 | Letter | 350/1.1 |
| 4,217,318 | 8/1980 | Anderson | 264/1 |

OTHER PUBLICATIONS

Raytheon Company Product Brochure, Optical Materials "Raytran ® ZS".
Kodak Product Brochure "Kodak Irtran".

*Primary Examiner*—Gary P. Straub

[57] ABSTRACT

Optical-grade zinc sulfide bodies produced by the CVD technique and subjected to an aftertreatment under a high gas pressure and at elevated temperature possess improved optical properties. They are suited for use as infrared windows.

8 Claims, 2 Drawing Figures

ZINC SULFIDE BODY FOR OPTICAL PURPOSES

BACKGROUND OF THE INVENTION

1. Field of the Invention

The invention relates to a zinc sulfide body for optical purposes produced by the CVD (Chemical Vapor Deposition) technique.

2. Discussion of Prior Art

Zinc sulfide bodies of this type, their production and their properties are described in Proc. Symp. Mater. Sci. Aspects Thin Film Syst. Sol. Energy Convers. 1974, pp 402–418, for example. Such bodies, produced mostly in plate or dome form, have high transmission in the 8 to 12 micron region and are used for infrared windows, for example. The transmission of such zinc sulfide bodies in the visible region is low. In the infrared region the exhibit a pronounced absorption band at about 6 microns.

The invention has as its object to improve a zinc sulfide body for optical purposes produced by the CVD technique in such a way that it has higher transmission in the visible region and more uniform transmission in the infrared region than the prior-art zinc sulfide bodies.

The zinc sulfide body in accordance with the invention is characterized in that it has been subjected to an aftertreatment involving the concurrent use of a gas or gas mixture, under high pressure, which does not react with zinc sulfide and of a temperature of at least 300° C., and that it exhibits no absorption band at about 6 microns.

Such a zinc sulfide body which has been subjected to an aftertreatment involving the concurrent use of a gas or gas mixture, under a pressure ranging from 800 to 3000 bars, and preferably from 1000 to 3000 bars, which does not react with zinc sulfide, and of a temperature ranging from 600° to 1200° C., and preferably from 850° to 1000° C., has proved itself particularly well.

It has been found that an aftertreatment involving the concurrent use of gas or gas mixture, under a pressure of 1200 bars, which does not react with zinc sulfide, and of a temperature of 900° C. is particularly advantageous.

Especially the inert gases have proved themselves as gases which will not react with zinc sulfide. The preferred gas is argon. A gas particularly contemplated too is nitrogen.

The duration of the pressure-temperature treatment depends on the pressure and temperature levels. While at 1200 bars and 900° C., for example, a treating time of 4 hours is required to obtain a zinc sulfide body having the desired properties, the treating time at 2000 bars and 1100° C. is reduced to one hour. Generally the treating time will decrease with increase of pressure and/or in temperature.

Surprisingly, the aftertreated zinc sulfide bodies in accordance with the invention exhibit higher transmission in the visible region than the known untreated bodies, and no absorption band at about 6 microns in the infrared region.

Like untreated zinc sulfide bodies, the zinc sulfide bodies in accordance with the invention are suitable for use as infrared windows.

BRIEF DESCRIPTION OF DRAWINGS

Referring to the annexed drawings.

The production of zinc sulfide bodies in accordance with the invention is described in the following example:

EXAMPLE

Small optical-grade zinc sulfide plates measuring 24×24×5 mm produced by the CVD technique were placed on a tantalum dish and introduced into a pressure vessel. After evacuation of the pressure vessel, argon was injected under a pressure of about 300 bars. The temperature was then raised continuously to 900° C., with the pressure rising to 1200 bars. The pressure of 1200 bars and the temperature of 900° C. were maintained for 4 hours. The zinc sulfide plates were then allowed to cool to room temperature with decompression of the argon and retention of an argon atmosphere.

Since the surfaces of the aftertreated zinc sulfide plates in accordance with the invention had a milky appearance, they were polished.

The transmittance of the aftertreated zinc sulfide plates was measured in the visible region with a Beckmann DK 2A spectral photometer and in the infrared region with a Perkin Elmer spectrometer. Zn sulfide plates which were not so aftertreated were also measured by the same apparatus and the transmission (in percent) against wave lengths (in microns) is plotted in FIGS. 1 and 2 for both the ZnS plates.

Figure 1:
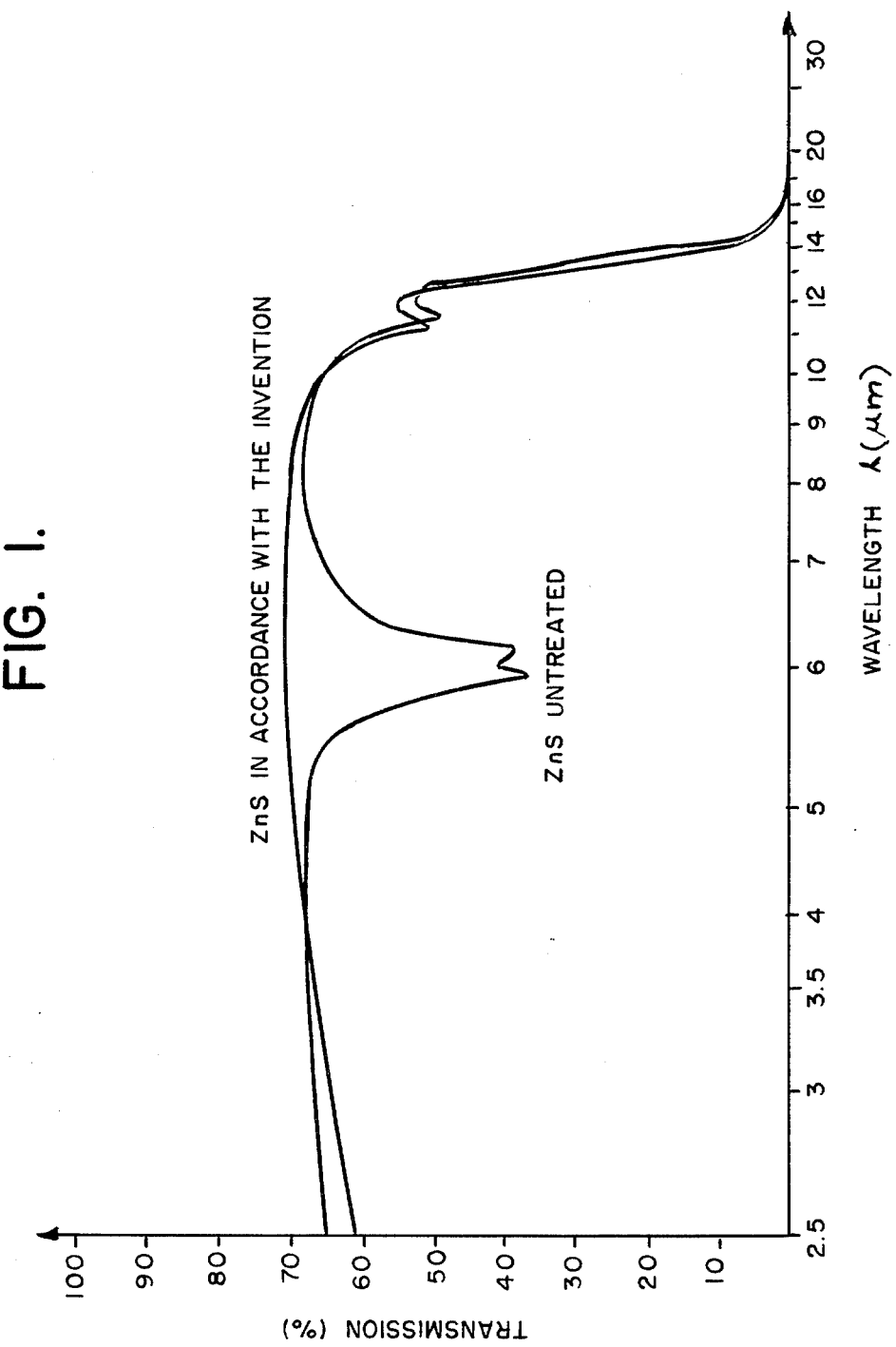
FIG. 1 is a graph comparing an untreated zinc sulfide plate and a zinc sulfide plate treated in accordance with the invention in respect of transmission (in percent) at the stated wave lengths.
Figure 2:
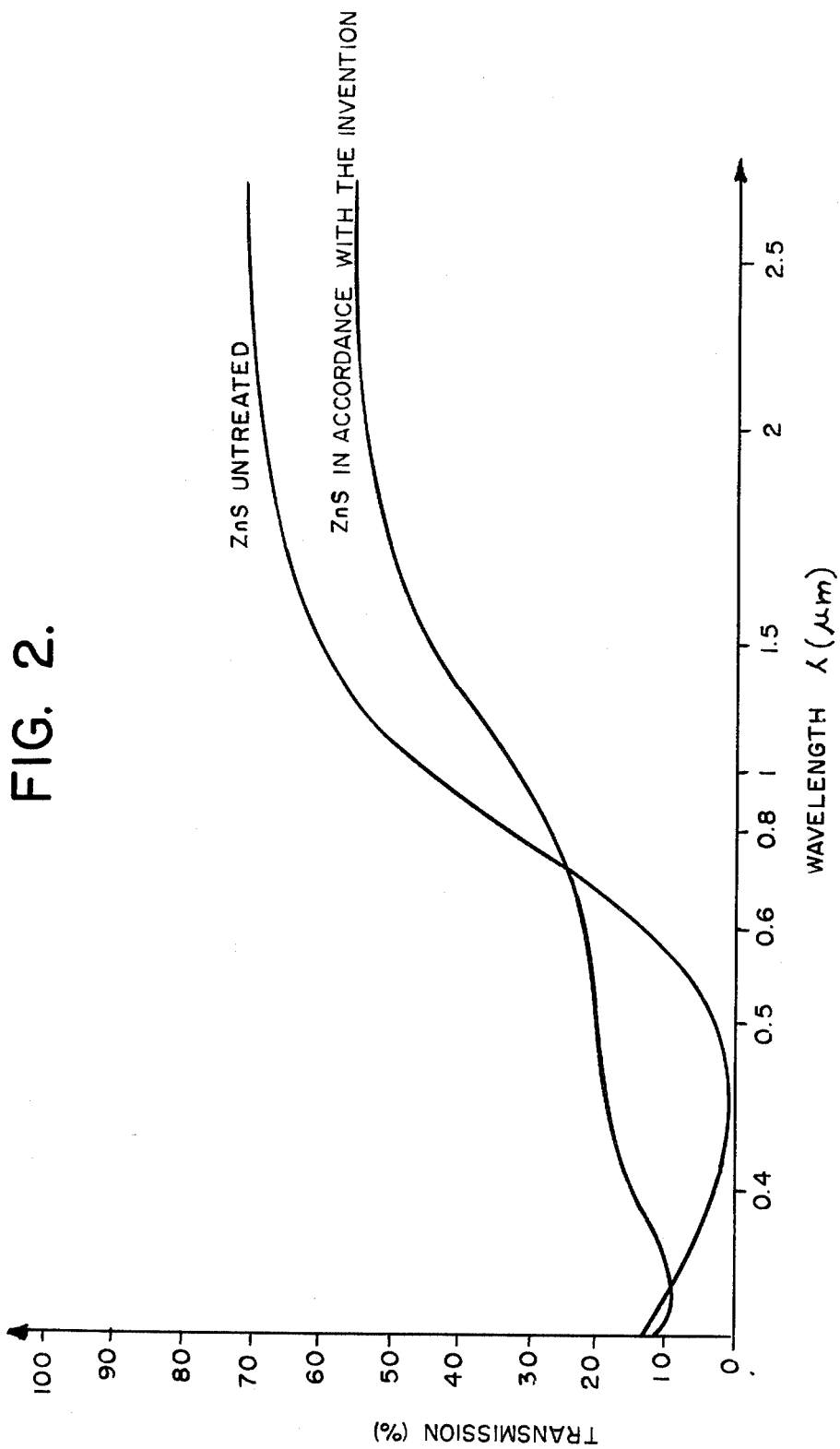
FIG. 2 is a graph similar to that of FIG. 1, comparing the respective plates for percent transmission at different wave lengths.

As is apparent from the curves of FIGS. 1 and 2, the zinc sulfide plates in accordance with the invention possesses higher transmission in the region from about 0.4 to about 0.5 micron than untreated plates, namely, from 15 to 20 percent, as against less than 5 percent. In the infrared region, the zinc sulfide plates in accordance with the invention are distinguished by the absence of the pronounced absorption band at about 6 microns.

What is claimed is:

1. A process for improving the light transmission from the 0.4 to about 0.5 micron wavelength range and the transmission at about 6 micron wavelength of an optical zinc sulfide body, produced by the CVD (Chemical Vapor Deposition) Technique which comprises contacting said optical zinc sulfide body at a temperature of at least 300° C. with a gas or gas mixture which is under a pressure ranging from 800 to 3000 bars, which gas or gas mixture does not react to the said optical zinc sulfide body.

2. A process according to claim 1, wherein the gas is at a temperature of 600° to 1200° C.

3. A process according to claim 2, wherein the gas is argon.

4. A process according to claim 2, wherein the gas is an inert gas.

5. A process according to claim 4, wherein the gas is at a pressure of 1000 to 3000 bars and at a temperature of 850° to 1000° C.

6. A process according to claim 5, wherein the gas is under a pressure of 1200 bars and has a temperature of about 900° C.

7. A process according to claim 1, wherein said zinc sulfide body is in the form of a plate.

8. A process according to claim 1, wherein said zinc sulfide body is in the form of a dome.

* * * * *